(12) United States Patent
Kim

(10) Patent No.: US 9,685,011 B2
(45) Date of Patent: *Jun. 20, 2017

(54) VEHICLE SAFETY CONTROL APPARATUS AND METHOD USING CAMERAS

(71) Applicant: MANDO CORPORATION, Pyeongtaek-Si, Gyeonggi-do (KR)

(72) Inventor: Myung-Woo Kim, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 276 days.

This patent is subject to a terminal disclaimer.

(21) Appl. No.: 14/308,894

(22) Filed: Jun. 19, 2014

(65) Prior Publication Data

US 2015/0054958 A1    Feb. 26, 2015

(30) Foreign Application Priority Data

Aug. 23, 2013  (KR) .................. 10-2013-0100067

(51) Int. Cl.
*G07C 5/08* (2006.01)
*H04N 5/222* (2006.01)
(Continued)

(52) U.S. Cl.
CPC ....... *G07C 5/0866* (2013.01); *G06K 9/00791* (2013.01); *G06K 9/00805* (2013.01);
(Continued)

(58) Field of Classification Search
CPC .......... G06K 9/00791; G06K 9/00805; G07C 5/0866; H04N 5/222; H04N 5/23238;
(Continued)

(56) References Cited

U.S. PATENT DOCUMENTS 5,892,855 A * 4/1999 Kakinami ............ G06K 9/4633
348/119
2003/0025791 A1 * 2/2003 Kaylor ............. G08B 13/19628
348/143

(Continued)

FOREIGN PATENT DOCUMENTS

| CN | 101793528 A | 8/2010 |
| JP | 2004-301567 A | 10/2004 |
| KR | 2013-0007243 A | 1/2013 |

OTHER PUBLICATIONS

Chinese Office Action dated Jul. 4, 2016 issued in Chinese Patent Application No. 201410406326.4.

(Continued)

*Primary Examiner* — Behrooz Senfi
(74) *Attorney, Agent, or Firm* — McDermott Will & Emery LLP

(57) ABSTRACT

A vehicle safety control apparatus using cameras includes a first camera configured to photograph a current object at at least one of a narrow angle and a straight angle during running, a second camera configured to photograph the current object at a wide angle during the running, an image processing unit configured to perform image processing on first current object image data captured by the first camera and second current object image data captured by the second camera, a recognition unit configured to recognize the first and second current object image data on which the image processing unit has performed the image processing, a storage unit configured to cause the recognized data to match preset reference object-specific data and separately store the data matching the preset reference object-specific data; and a control unit configured to receive the recognized data and deliver a storage command to the storage unit.

24 Claims, 18 Drawing Sheets

(51) Int. Cl.
*H04N 7/18* (2006.01)
*G06K 9/00* (2006.01)
*H04N 5/232* (2006.01)

(52) U.S. Cl.
CPC ............... *H04N 5/222* (2013.01); *H04N 7/18* (2013.01); *H04N 5/23238* (2013.01)

(58) Field of Classification Search
CPC ...... H04N 7/18; B60R 2300/301; B60R 1/00; B60R 2300/105; B60R 2300/802
USPC ......................................................... 348/149
See application file for complete search history.

(56) References Cited

U.S. PATENT DOCUMENTS

| 2004/0189512 | A1* | 9/2004 | Takashima | ............ G01S 13/867 342/70 |
| 2006/0098843 | A1* | 5/2006 | Chew | ........................ B61K 9/08 382/103 |
| 2011/0010094 | A1* | 1/2011 | Simon | .................... B60W 30/16 701/301 |
| 2012/0257056 | A1* | 10/2012 | Otuka | .................... G06T 1/0007 348/148 |
| 2014/0118551 | A1* | 5/2014 | Ikeda | ........................ B60R 1/00 348/148 |

OTHER PUBLICATIONS

Chinese Office Action dated Dec. 16, 2016 issued in Chinese Patent Application No. 201410406326.4.

* cited by examiner

VEHICLE SAFETY CONTROL APPARATUS AND METHOD USING CAMERAS

CROSS-REFERENCE TO RELATED APPLICATION

This application claims the benefit of Korean Patent Application No. P2013-0100067, filed on Aug. 23, 2013 in the Korean Intellectual Property Office, the disclosure of which is incorporated herein by reference.

BACKGROUND

1. Field

Embodiments of the present invention relate to a vehicle safety control apparatus and method using cameras.

2. Description of the Related Art

In general, a camera installed in a conventional vehicle is used in various functions (lane departure warning (LDW), forward collision warning (FCW), high-beam assist (HBA), pedestrian warning (PW), or traffic sign recognition (TSR)) as a single or stereo camera.

Here, the single camera is advantageous in terms of cost or a size, but its efficiency is low in terms of a distance measurement error or control reliability as compared to a stereo or multi field of view (FOV) camera.

On the other hand, the stereo camera outperforms the single camera in terms of control performance because the stereo camera has a smaller vertical distance measurement error than the single camera. However, in the stereo camera, a narrower FOV should be used so as to measure a farther distance in vertical performance.

This conventional camera has limitation in providing convenience of driving for a driver because a recognition rate for a current object is degraded during running.

In addition, the conventional camera has low control reliability because one camera is used for control and redundancy is degraded. The conventional camera also has lower stereo performance than when two cameras are used.

In addition, the conventional camera has a problem in that a unique performance is not provided due to the conflict with an FOV required by each safety control function (lane detection (LD), vehicle detection (VD), pedestrian detection (PD), HBA, TSR, or the like).

Because this conventional camera has limitation in providing convenience of driving for the driver unfamiliar with the driving due to the degradation of the recognition rate for the current object during running, there is limitation in preventing a traffic accident from occurring in advance.

Accordingly, research on an improved vehicle safety control apparatus and method using cameras for preventing a traffic accident from occurring in advance while providing convenience of driving for the driver by efficiently increasing an image recognition rate for a current object during running has recently continued.

SUMMARY

Therefore, it is one aspect of the present invention to provide a vehicle safety control apparatus and method using cameras that may prevent a traffic accident from occurring in advance while providing convenience of driving for a driver because an image recognition rate may be efficiently increased for a current object during running.

It is another aspect of the present invention to provide a vehicle safety control apparatus and method using cameras that may further prevent a traffic accident from occurring in advance because it is possible to induce a driver to carefully drive during running.

Additional aspects of the invention will be set forth in part in the description which follows and, in part, will be obvious from the description, or may be learned by practice of the invention.

In accordance with one aspect of the present invention, a vehicle safety control apparatus using cameras includes: a first camera configured to photograph a current object at at least one of a narrow angle and a straight angle during running; a second camera configured to photograph the current object at a wide angle during the running; an image processing unit configured to perform image processing on first current object image data captured by the first camera and second current object image data captured by the second camera; a recognition unit configured to recognize the first and second current object image data on which the image processing unit has performed the image processing; a storage unit configured to cause the first and second current object image data recognized by the recognition unit to match preset reference object-specific data and separately store the first and second current object image data matching the reference object-specific data; and a control unit configured to receive the first and second current object image data recognized by the recognition unit and deliver a storage command to the storage unit so that the first and second current object image data matching the reference object-specific data are separately stored.

In accordance with another aspect of the present invention a vehicle safety control apparatus using cameras includes: a first camera configured to photograph a current object at at least one of a narrow angle and a straight angle during running; a second camera configured to photograph the current object at a wide angle during the running; an image processing unit configured to perform image processing on first current object image data captured by the first camera and second current object image data captured by the second camera; a recognition unit configured to recognize the first and second current object image data on which the image processing unit has performed the image processing; a selection unit configured to select a matching mode for causing the first and second current object image data recognized by the recognition unit to match preset reference object-specific data; a storage unit configured to separately store the first and second current object image data matching the preset reference object-specific data in the selection unit; and a control unit configured to receive the first and second current object image data recognized by the recognition unit and deliver a selection command in the matching mode for causing the first and second current object image data recognized by the recognition unit to match the reference object-specific data.

In accordance with another aspect of the present invention, the first camera includes a narrow angle lens.

In accordance with still another aspect of the present invention, the second camera includes a wide angle lens.

In accordance with still another aspect of the present invention, the first current object image data represents a distance from at least one of a lane, another vehicle, a pedestrian, a signal sign, and a light source.

In accordance with still another aspect of the present invention, the second current object image data represents at least one of a lane, another vehicle, a pedestrian, a signal sign, and a light source.

In accordance with still another aspect of the present invention, the light source is at least one of a headlight and a taillight of another vehicle and a signal light.

In accordance with still another aspect of the present invention, the vehicle safety control apparatus using the cameras further includes a first identification unit configured to cause a current matching state for the reference object-specific data to be identified when the first and second current object image data are caused to match the reference object-specific data in the storage unit according to control of the control unit.

In accordance with still another aspect of the present invention, the vehicle safety control apparatus using the cameras further includes a second identification unit configured to cause a state in which current object images are separately stored to be identified when the first and second current object image data matching the reference object-specific data are separately stored in the storage unit.

In accordance with still another aspect of the present invention, the vehicle safety control apparatus using the cameras further includes a third identification unit configured to cause a current matching state for the reference object-specific data to be identified when the first and second current object image data are caused to match the reference object-specific data in the selection unit according to control of the control unit.

In accordance with still another aspect of the present invention, a vehicle safety control method using cameras includes: photographing, by a first camera, a current object at at least one of a narrow angle and a straight angle and photographing, by a second camera, the current object at a wide angle during running; performing, by an image processing unit, image processing on first current object image data captured by the first camera and second current object image data captured by the second camera; recognizing, by a recognition unit, the first and second current object image data on which the image processing unit has performed the image processing; and causing, by a storage unit, the first and second current object image data recognized by the recognition unit to match preset reference object-specific data and separately storing, by the storage unit, the first and second current object image data matching the reference object-specific data.

In accordance with still another aspect of the present invention, a vehicle safety control method using cameras includes: photographing, by a first camera, a current object at at least one of a narrow angle and a straight angle and photographing, by a second camera, the current object at a wide angle during running; performing, by an image processing unit, image processing on first current object image data captured by the first camera and second current object image data captured by the second camera; recognizing, by a recognition unit, the first and second current object image data on which the image processing unit has performed the image processing; selecting, by a selection unit, a matching mode for causing the first and second current object image data recognized by the recognition unit to match preset reference object-specific data; and separately storing, by a storage unit, the first and second current object image data matching the preset reference object-specific data in the selection unit.

In accordance with still another aspect of the present invention, the vehicle safety control method using the cameras further includes causing, by a first identification unit, a current matching state for the reference object-specific data to be identified when the first and second current object image data are caused to match the reference object-specific data in the storage unit according to control of a control unit.

In accordance with still another aspect of the present invention, the vehicle safety control method using the cameras further includes causing, by a second identification unit, a state in which current object images are separately stored to be identified when the first and second current object image data matching the reference object-specific data are separately stored in the storage unit.

In accordance with still another aspect of the present invention, the vehicle safety control method using the cameras further includes causing, by a third identification unit, a current matching state for the reference object-specific data to be identified when the first and second current object image data are caused to match the reference object-specific data in the selection unit according to control of the control unit.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Preferred embodiments of the present invention will be described in detail below with reference to the accompanying drawings.

Figure 1:
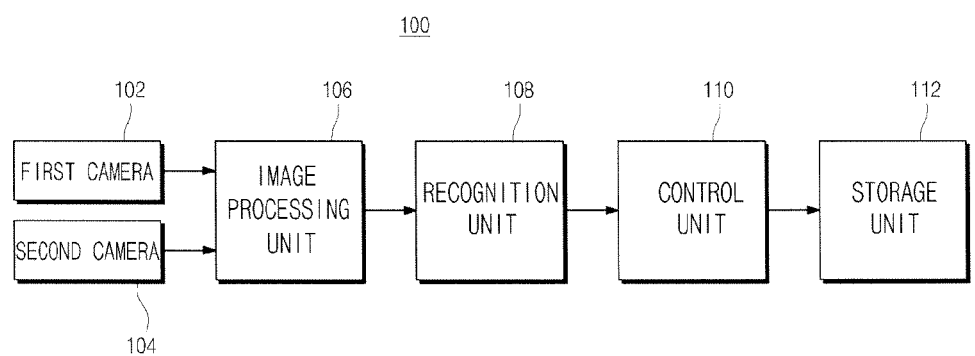
FIG. 1 is a block configuration diagram illustrating a vehicle safety control apparatus using cameras according to a first embodiment of the present invention.

FIG. 1 is a block configuration diagram illustrating a vehicle safety control apparatus using cameras according to a first embodiment of the present invention.

Referring to FIG. 1, the vehicle safety control apparatus 100 using the cameras according to the first embodiment of the present invention includes a first camera 102, a second camera 104, an image processing unit 106, a recognition unit 108, a control unit 110, and a storage unit 112.

The first camera 102 is provided to photograph a current object at at least one of a narrow angle and a straight angle during running, and the second camera 104 is provided to photograph the current object at a wide angle during the running.

Here, although not illustrated, the first camera 102 may include a narrow angle lens (not illustrated), and the second camera 104 may include a wide angle lens (not illustrated).

Here, the narrow angle lens (not illustrated) of the first camera 102 may be a lens having a horizontal field of view (HFOV) angle which is less than or equal to 36 degrees and increase a recognition rate of a vertical component, and the wide angle lens (not illustrated) of the second camera 104 may be a lens having an HFOV angle which is greater than or equal to 120 degrees and increase a recognition rate of a horizontal component.

Here, the wide angle lens (not illustrated) of the second camera 104 is applicable to a black box (not illustrated) so as to increase the recognition rate of the horizontal component.

The image processing unit 106 is provided to perform image processing on first current object image data captured by the first camera 102 and second current object image data captured by the second camera 104.

Here, the image processing unit 106 may generate information of a distance from the first current object image data as a stereo function using the first current object image data captured by the first camera 102 and the second current object image data captured by the second camera 104.

Here, the first current object image data may represent a distance from at least one of a lane, another vehicle, a pedestrian, a signal sign, and a light source, the second current object image data may represent at least one of the lane, the other vehicle, the pedestrian, the signal sign, and the light source, and the light source may be at least one of a headlight and a taillight of the other vehicle and a signal light.

Here, although not illustrated, the image processing unit 106 may include a normal image processor (not illustrated), and the present invention is not limited thereto. Any image processing means for processing an image may be used.

The recognition unit 108 is provided to recognize the first and second current object image data on which the image processing unit 106 has performed the image processing.

The recognition unit 108 may improve a recognition rate because it is possible to increase redundancy using the first camera 102 and the second camera 104.

Here, although not illustrated, the recognition unit 108 may include a normal image recognition sensor (not illustrated), and the present invention is not limited thereto. Any image data recognition means for recognizing image data may be used.

The storage unit 112 is provided to cause the first and second current object image data recognized by the recognition unit 108 to match preset reference object-specific data, and separately store the first and second current object image data matching the reference object-specific data.

That is, the storage unit 112 may be provided to cause the first and second current object image data recognized by the recognition unit 108 to match the reference object-specific data set in a lookup table, and separately store the first and second current object image data matching the reference object-specific data.

For example, the storage unit 112 may store the first current object image data representing a distance from at least one of a lane, another vehicle, a pedestrian, a signal sign, and a light source matching the reference object-specific data and the second current object image data representing at least one light source of a headlight and a taillight of the other vehicle and a signal light matching the reference object-specific data.

In addition, the storage unit 112 may cause the first and second current object image data recognized by the recognition unit 108 to match the reference object-specific data set in a geometry model and may be provided to separately store the second current object image data after estimating a distance of the first current object image data matching the reference object-specific data.

Here, the storage unit 112 may include a normal memory (not illustrated). For example, the storage unit 112 may be a normal secure digital (SD) memory card (not illustrated), and the present invention is not limited thereto. Any storage means for storing image data may be used.

The control unit 110 receives the first and second current object image data recognized by the recognition unit 108 and delivers a storage command to the storage unit 112 so that the first and second current object image data matching the reference object-specific data are separately stored.

Here, the control unit 110 controls the vehicle using recognition information and distance estimation information of a lane, another vehicle, a signal sign, a signal light, a pedestrian, a light source, etc.

Here, although not illustrated, the control unit 110 may be provided to include a normal micro control unit (MCU) (not illustrated) for controlling an overall operation of a processor, a memory, and an input/output device provided within a single chip, and the present invention is not limited thereto. Any control means capable of controlling an overall operation of a vehicle may be used.

A vehicle safety control method for use in the vehicle safety control apparatus 100 using the cameras according to the first embodiment of the present invention will be described with reference to in FIGS. 2 and 3.

Figure 2:
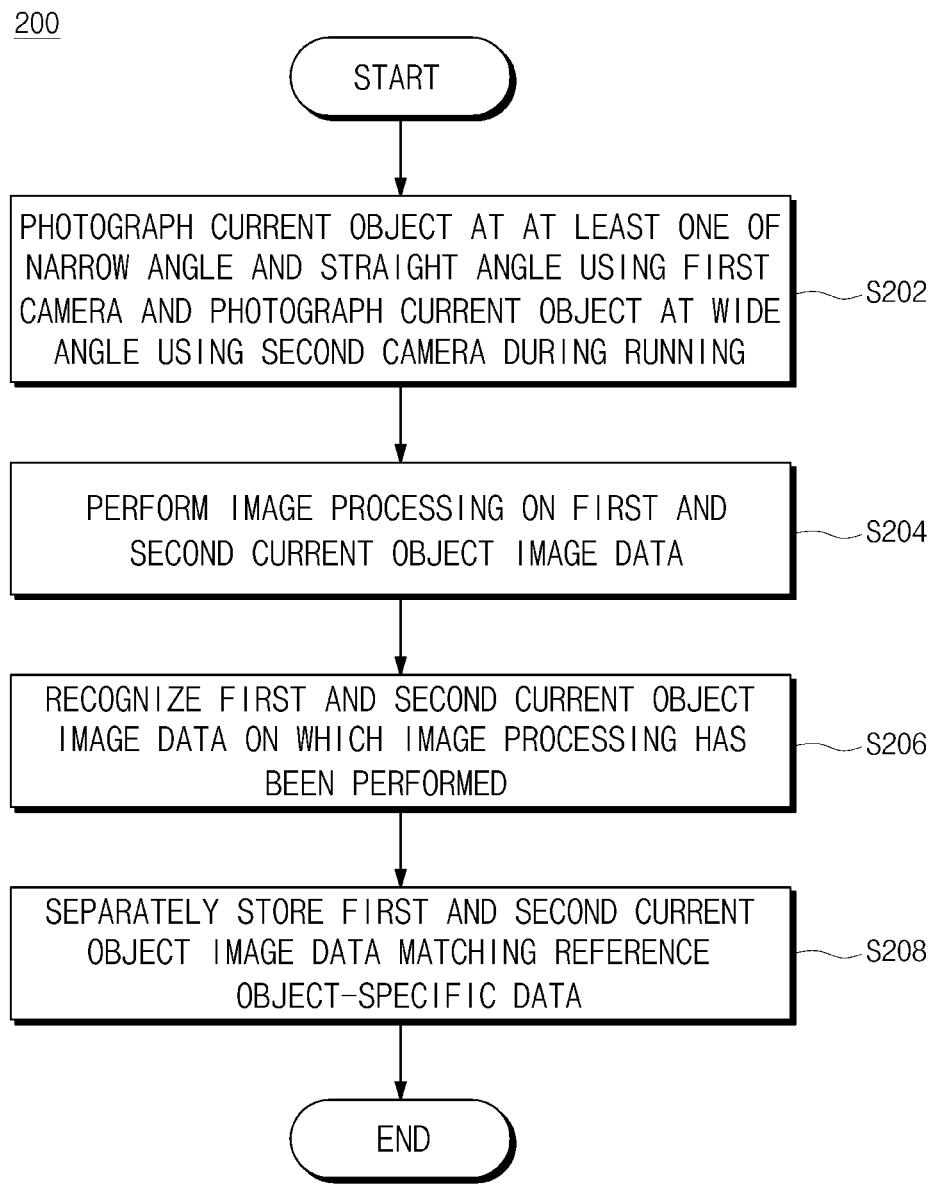
FIG. 2 is a flowchart illustrating a vehicle safety control method for use in the vehicle safety control apparatus using the cameras according to the first embodiment of the present invention.
Figure 3:
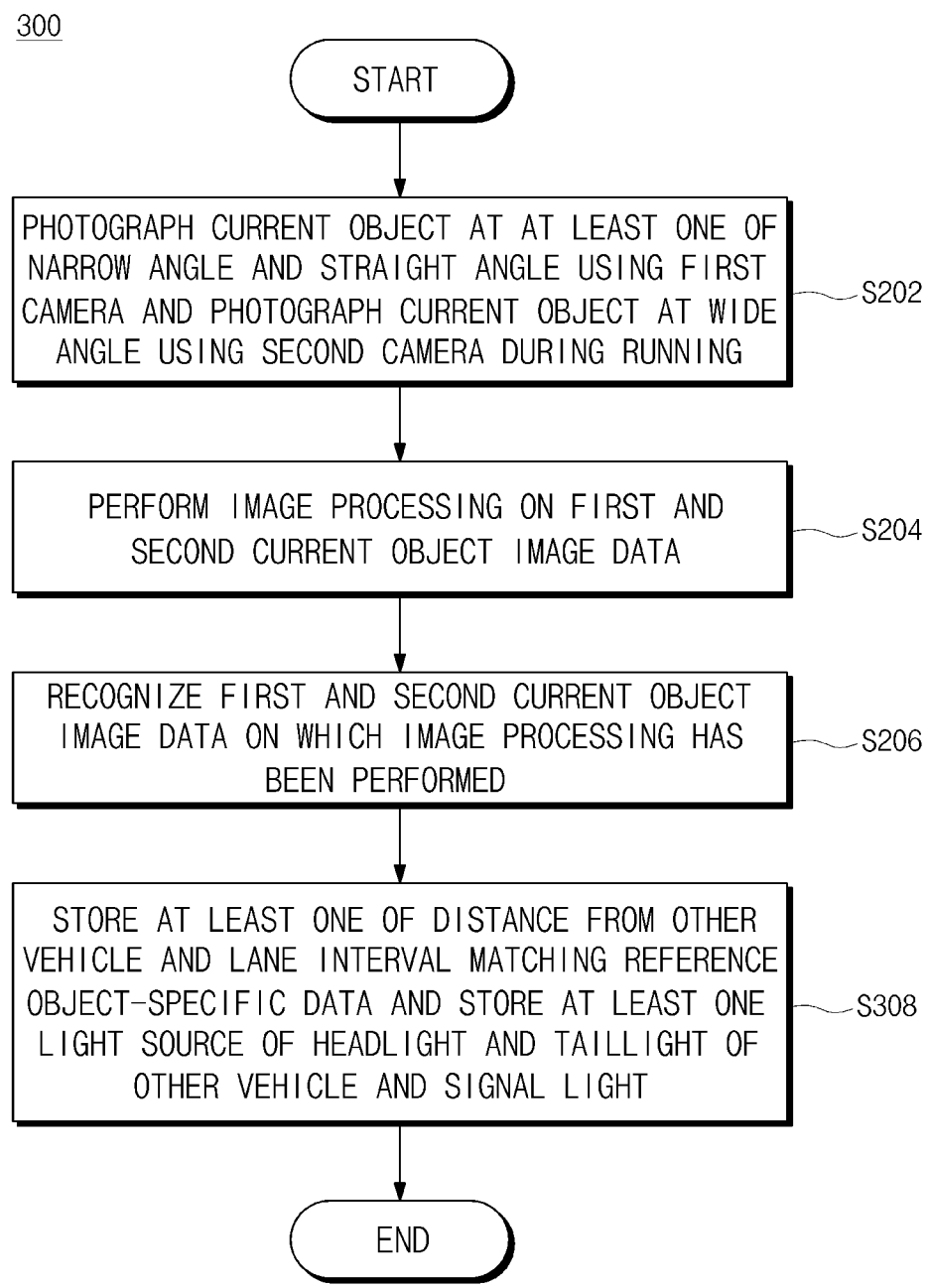
FIG. 3 is a flowchart illustrating an example of the vehicle safety control method for use in the vehicle safety control apparatus using the cameras according to the first embodiment of the present invention.

FIG. 2 is a flowchart illustrating the vehicle safety control method for use in the vehicle safety control apparatus using the cameras according to the first embodiment of the present invention, and FIG. 3 is a flowchart illustrating an example of the vehicle safety control method for use in the vehicle safety control apparatus using the cameras according to the first embodiment of the present invention.

Referring to FIGS. 2 and 3, vehicle safety control methods 200 and 300 for use in the vehicle safety control apparatus (100 in FIG. 1) using the cameras according to the first embodiment of the present invention include a photographing step S202, an image processing step S204, a recognition step S206, and storage steps S208 and S308.

First, in the photographing step S202, during running, the first camera (102 in FIG. 1) photographs a current object at at least one of a narrow angle and a straight angle and the second camera (104 in FIG. 1) photographs the current object at a wide angle.

Thereafter, in the image processing step S204, the image processing unit (106 in FIG. 1) performs image processing on first current object image data captured by the first camera (102 in FIG. 1) and second current object image data captured by the second camera (104 in FIG. 1).

Thereafter, in the recognition step S206, the recognition unit (108 in FIG. 1) recognizes the first and second current object image data on which the image processing unit (106 in FIG. 1) has performed the image processing.

Finally, in the storage step S208, the first and second current object image data recognized by the recognition unit (108 in FIG. 1) are caused to match the reference object-specific data in the storage unit (112 in FIG. 1), and the first and second current object image data matching the reference object-specific data are separately stored in the storage unit (112 in FIG. 1).

That is, in the storage step S208, the first and second current object image data recognized by the recognition unit (108 in FIG. 1) may be caused to match the reference object-specific data set in a lookup table in the storage unit (112 in FIG. 1), and the first and second current object image data matching the reference object-specific data may be separately stored in the storage unit (112 in FIG. 1).

For example, as illustrated in FIG. 3, in the storage step S308, the first current object image data representing a distance from at least one of a lane, another vehicle, a pedestrian, a signal sign, and a light source matching the reference object-specific data and the second current object image data representing at least one light source of a headlight and a taillight of the other vehicle and a signal light matching the reference object-specific data may be stored.

In addition, although not illustrated, in a storage step (not illustrated), the first and second current object image data recognized by the recognition unit (108 in FIG. 1) may be caused to match the reference object-specific data set in a geometry model in the storage unit (112 in FIG. 1) and the second current object image data may be separately stored in the storage unit (112 in FIG. 1) after estimating a distance of the first current object image data matching the reference object-specific data.

As described above, in the vehicle safety control apparatus 100 using the cameras according to the first embodiment of the present invention including the first camera 102, the second camera 104, the image processing unit 106, the recognition unit 108, the control unit 110, and the storage unit 112, the vehicle safety control methods 200 and 300 including the photographing step S202, the image processing step S204, the recognition step S206, and the storage steps S208 and S308 are performed.

Accordingly, in the vehicle safety control apparatus 100 and the vehicle safety control methods 200 and 300 using the cameras according to the first embodiment of the present invention, the first camera 102 may photograph a current object at a distance from at least one of a lane, another vehicle, a pedestrian, a signal sign, and a light source at at least one of a narrow angle and a straight angle during running, the second camera 104 may photograph the current object representing at least one light source of a headlight and a taillight of the other vehicle and a signal light at a wide angle, and the storage unit 112 may separately store the current object at the distance from the at least one of the lane, the other vehicle, the pedestrian, the signal sign, and the light source photographed by the first camera 102 at the narrow angle and the current object representing the at least one light source of the headlight and the taillight of the other vehicle and the signal light photographed by the second camera 104 at the wide angle.

According to the vehicle safety control apparatus 100 and the vehicle safety control methods 200 and 300 using the cameras according to the first embodiment of the present invention, it is possible to prevent a traffic accident from occurring in advance while providing convenience of driving for the driver because an image recognition rate may be efficiently increased for a current object during the running.

Figure 4:
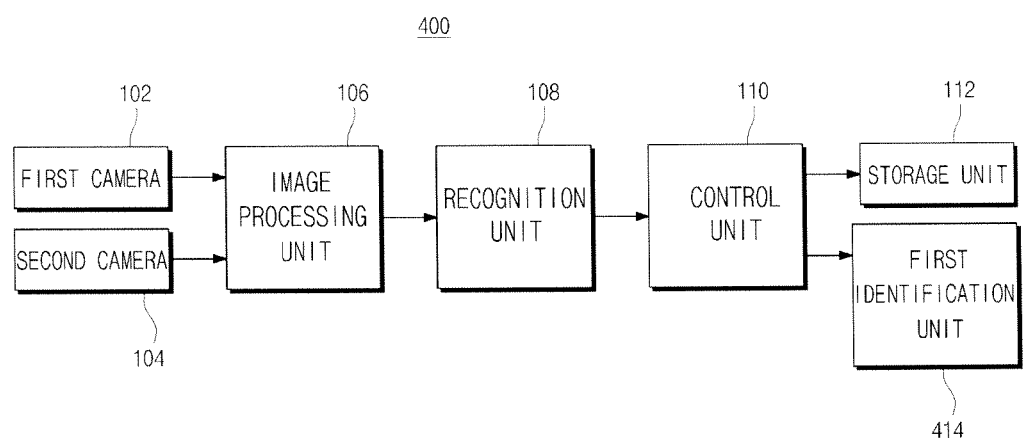
FIG. 4 is a block configuration diagram illustrating a vehicle safety control apparatus using cameras according to a second embodiment of the present invention.

FIG. 4 is a block configuration diagram illustrating a vehicle safety control apparatus using cameras according to a second embodiment of the present invention.

Referring to FIG. 4, like the vehicle safety control apparatus (100 in FIG. 1) using the cameras according to the first embodiment of the present invention, the vehicle safety control apparatus 400 using the cameras according to the second embodiment of the present invention includes a first camera 102, a second camera 104, an image processing unit 106, a recognition unit 108, a control unit 110, and a storage unit 112.

Functions and organic connection relations of elements of the vehicle safety control apparatus 400 using the cameras according to the second embodiment of the present invention are the same as those of the vehicle safety control apparatus (100 in FIG. 1) using the cameras according to the first embodiment of the present invention, and a detailed description thereof will thus be omitted.

Here, the vehicle safety control apparatus 400 using the cameras according to the second embodiment of the present invention further includes a first identification unit 414.

That is, the first identification unit 414 causes a current matching state for the reference object-specific data to be identified when the first and second current object image data are caused to match the reference object-specific data in the storage unit 112 according to control of the control unit 110.

Here, although not illustrated, the first identification unit 414 may include at least one of an alarm (not illustrated), a speaker (not illustrated), and a light-emitting member (not illustrated) provided to allow a driver to identify information or a state of a vehicle, and at least one of a human machine interface (HMI) module (not illustrated) and a head-up display (HUD) module (not illustrated) mounted to form an interface between a user and a machine to allow a driver to recognize information or a state of a vehicle, and, thus cause the current matching state for the reference object-specific data to be identified through at least one of an alarm operation of the alarm (not illustrated), a voice operation of the speaker (not illustrated), a light emitting operation of the light emitting member (not illustrated), an HMI message display operation of the HMI module (not illustrated) and an HUD message display operation of the HUD module (not illustrated).

A vehicle safety control method for use in the vehicle safety control apparatus 400 using the cameras according to the second embodiment of the present invention will be described with reference to FIGS. 5 and 6.

Figure 5:
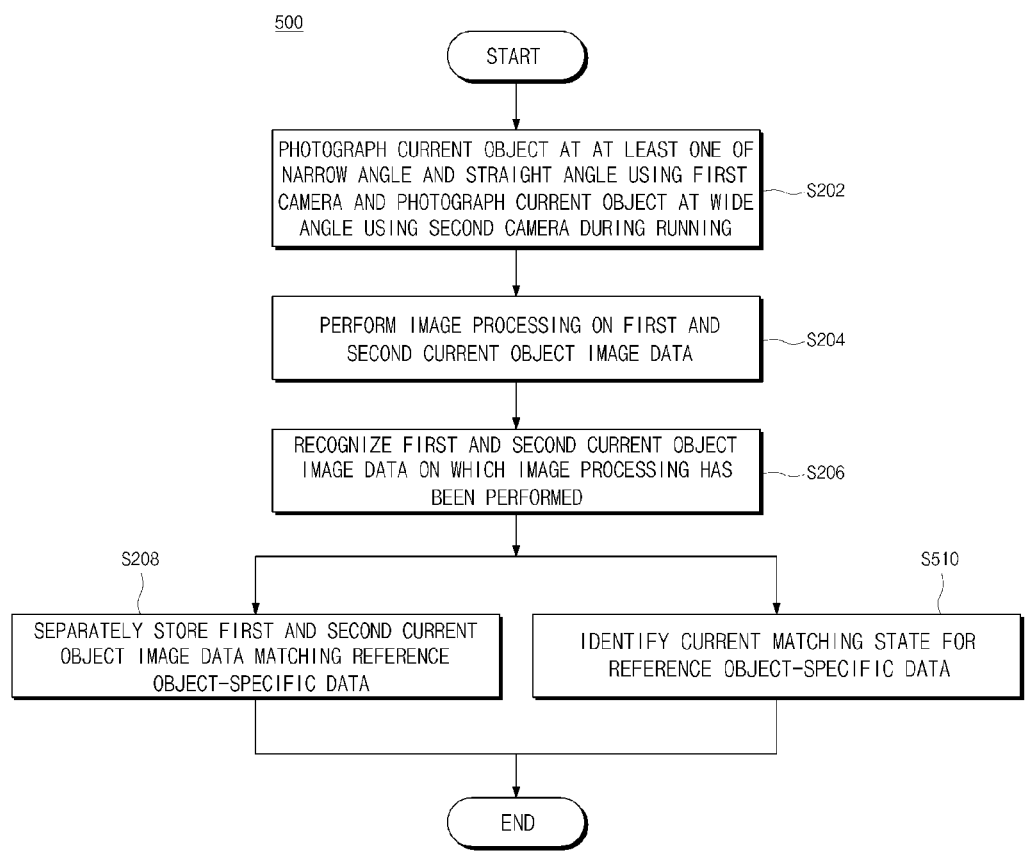
FIG. 5 is a flowchart illustrating a vehicle safety control method for use in the vehicle safety control apparatus using the cameras according to the second embodiment of the present invention.
Figure 6:
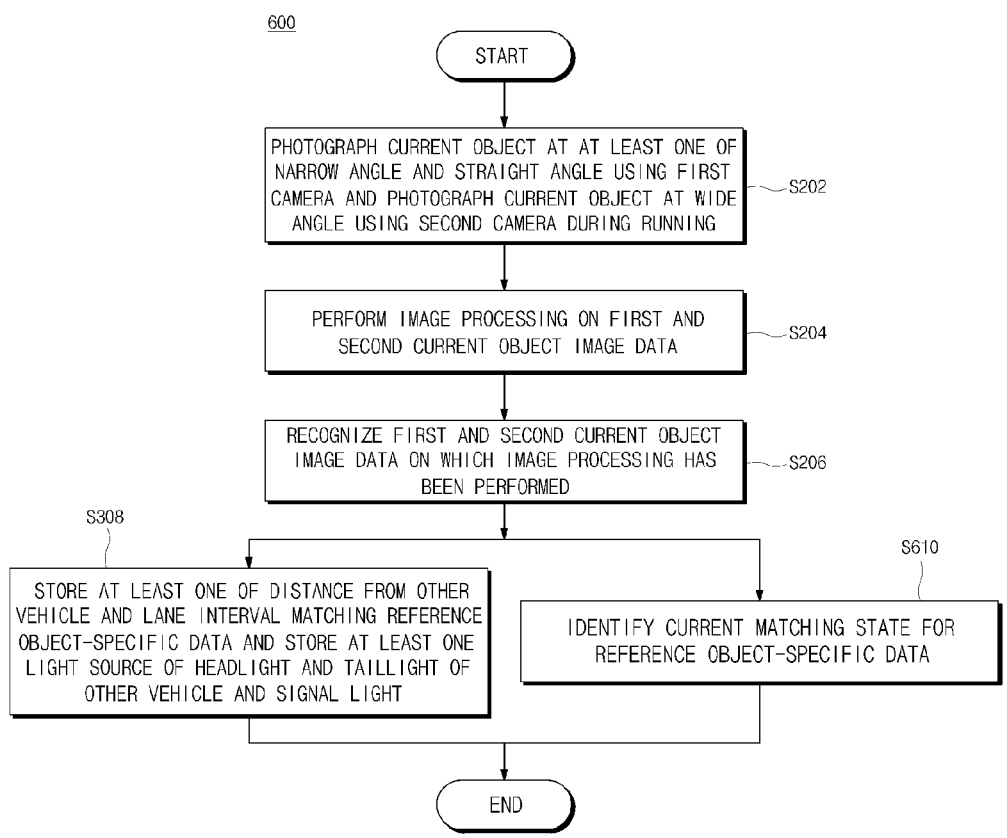
FIG. 6 is a flowchart illustrating an example of the vehicle safety control method for use in the vehicle safety control apparatus using the cameras according to the second embodiment of the present invention.

FIG. 5 is a flowchart illustrating the vehicle safety control method for use in the vehicle safety control apparatus using the cameras according to the second embodiment of the present invention, and FIG. 6 is a flowchart illustrating an example of the vehicle safety control method for use in the vehicle safety control apparatus using the cameras according to the second embodiment of the present invention.

Referring to FIGS. 5 and 6, like the vehicle safety control methods (200 and 300 in FIGS. 2 and 3) for use in the vehicle safety control apparatus (100 in FIG. 1) using the cameras according to the first embodiment of the present invention, vehicle safety control methods 500 and 600 for use in the vehicle safety control apparatus (400 in FIG. 4) using the cameras according to the second embodiment of the present invention include a photographing step S202, an image processing step S204, a recognition step S206, and storage steps S208 and S308.

Functions and organic connection relations of steps of the vehicle safety control methods 500 and 600 for use in the vehicle safety control apparatus (400 in FIG. 4) using the cameras 102 and 104 according to the second embodiment of the present invention are the same as those of the vehicle safety control methods (200 and 300 in FIGS. 2 and 3) for use in the vehicle safety control apparatus (100 in FIG. 1) using the cameras according to the first embodiment of the present invention, and a detailed description thereof will thus be omitted.

Here, the vehicle safety control methods 500 and 600 for use in the vehicle safety control apparatus (400 in FIG. 4) using the cameras according to the second embodiment of the present invention further include first identification steps S510 and S610 to be performed in synchronization with the storage steps S208 and S308.

That is, in the first identification steps S510 and S610, the first identification unit (414 in FIG. 4) causes a current matching state for the reference object-specific data to be identified when the first and second current object image data are caused to match the reference object-specific data in the storage unit (112 in FIG. 4) according to control of the control unit (110 in FIG. 4).

As described above, in the vehicle safety control apparatus 400 using the cameras according to the second embodiment of the present invention including the first camera 102, the second camera 104, the image processing unit 106, the recognition unit 108, the control unit 110, the storage unit 112, and the first identification unit 414, the vehicle safety control methods 500 and 600 including the photographing step S202, the image processing step S204, the recognition step S206, the storage steps S208 and S308, and the first identification steps S510 and S610 are performed.

Accordingly, in the vehicle safety control apparatus 400 and the vehicle safety control methods 500 and 600 using the cameras according to the second embodiment of the present invention, the first camera 102 may photograph a current object at a distance from at least one of a lane, another vehicle, a pedestrian, a signal sign, and a light source at at least one of a narrow angle and a straight angle during running, the second camera 104 may photograph the current object representing at least one light source of a headlight and a taillight of the other vehicle and a signal light at a wide angle, and the storage unit 112 may separately store the current object at the distance from the at least one of the lane, the other vehicle, the pedestrian, the signal sign, and the light source photographed by the first camera 102 at the narrow angle and the current object representing the at least one light source of the headlight and the taillight of the other vehicle and the signal light photographed by the second camera 104 at the wide angle.

According to the vehicle safety control apparatus 400 and the vehicle safety control methods 500 and 600 using the cameras according to the second embodiment of the present invention, it is possible to prevent a traffic accident from occurring in advance while providing convenience of driving for a driver because an image recognition rate may be efficiently increased for a current object during running.

In addition, according to the vehicle safety control apparatus 400 and the vehicle safety control methods 500 and 600 using the cameras according to the second embodiment of the present invention, the first identification unit (414 in FIG. 4) may cause a current matching state for the reference object-specific data to be identified.

According to the vehicle safety control apparatus 400 and the vehicle safety control methods 500 and 600 using the cameras according to the second embodiment of the present invention, it is possible to induce a driver to carefully drive during running and further prevent a traffic accident from occurring in advance because the driver may recognize a state in which the current object currently matches the reference object-specific data in the storage unit 112.

Figure 7:
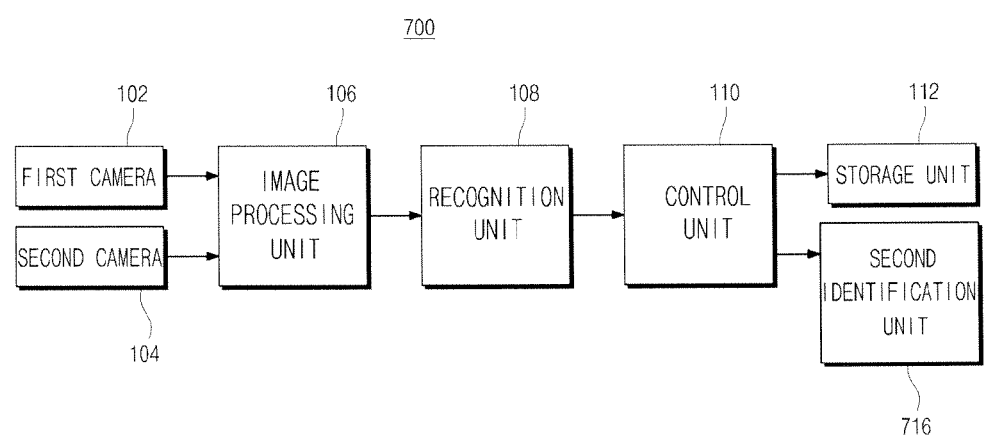
FIG. 7 is a block configuration diagram illustrating a vehicle safety control apparatus using cameras according to a third embodiment of the present invention.

FIG. 7 is a block configuration diagram illustrating a vehicle safety control apparatus using cameras according to a third embodiment of the present invention.

Referring to FIG. 7, like the vehicle safety control apparatus (100 in FIG. 1) using the cameras according to the first embodiment of the present invention, the vehicle safety control apparatus 700 using the cameras according to the third embodiment of the present invention includes a first camera 102, a second camera 104, an image processing unit 106, a recognition unit 108, a control unit 110, and a storage unit 112.

Functions and organic connection relations of elements of the vehicle safety control apparatus 700 using the cameras according to the third embodiment of the present invention are the same as those of the vehicle safety control apparatus (100 in FIG. 1) using the cameras according to the first embodiment of the present invention, and a detailed description thereof will thus be omitted.

Here, the vehicle safety control apparatus 700 using the cameras according to the third embodiment of the present invention further includes a second identification unit 716.

That is, the second identification unit 716 cause a state in which current object images are separately stored to be identified when the first and second current object image data matching the reference object-specific data are separately stored in the storage unit 112.

Here, although not illustrated, the second identification unit 716 may include at least one of an alarm (not illustrated), a speaker (not illustrated), and a light-emitting member (not illustrated) provided to allow a driver to identify information or a state of a vehicle, and at least one of an HMI module (not illustrated) and an HUD module (not illustrated) mounted to form an interface between a user and a machine to allow a driver to recognize information or a state of a vehicle, and, thus cause the state in which the current object images are separately stored to be identified through at least one of an alarm operation of the alarm (not illustrated), a voice operation of the speaker (not illustrated), a light emitting operation of the light emitting member (not illustrated), an HMI message display operation of the HMI module (not illustrated), and an HUD message display operation of the HUD module (not illustrated).

A vehicle safety control method for use in the vehicle safety control apparatus 700 using the camera according to the third embodiment of the present invention will be described with reference to FIGS. 8 and 9.

Figure 8:
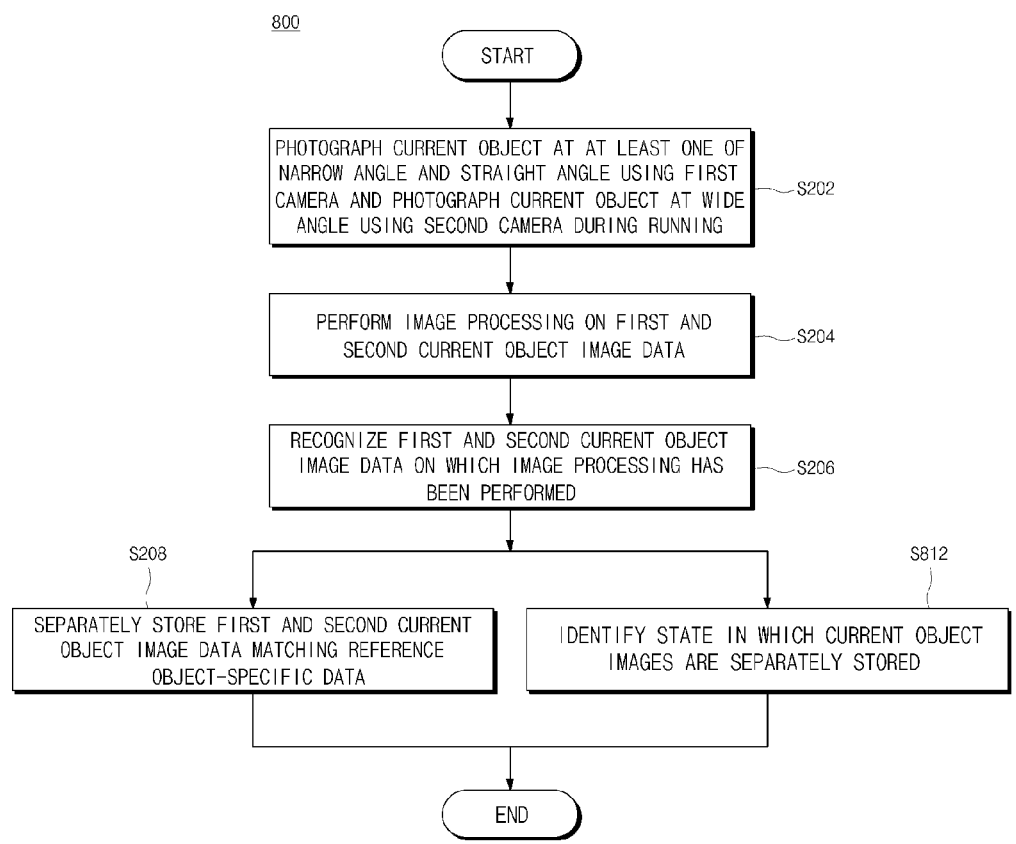
FIG. 8 is a flowchart illustrating a vehicle safety control method for use in the vehicle safety control apparatus using the cameras according to the third embodiment of the present invention.
Figure 9:
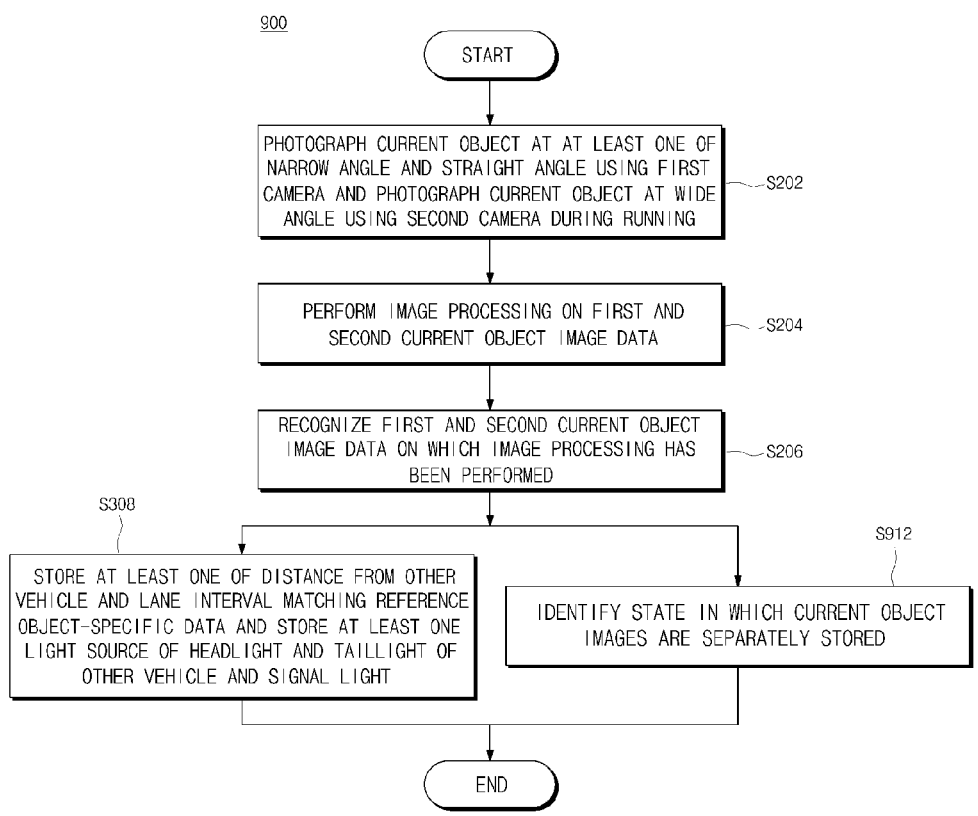
FIG. 9 is a flowchart illustrating an example of the vehicle safety control method for use in the vehicle safety control apparatus using the cameras according to the third embodiment of the present invention.

FIG. 8 is a flowchart illustrating the vehicle safety control method for use in the vehicle safety control apparatus using the cameras according to the third embodiment of the present invention, and FIG. 9 is a flowchart illustrating an example of the vehicle safety control method for use in the vehicle safety control apparatus using the cameras according to the third embodiment of the present invention.

Referring to FIGS. 8 and 9, like the vehicle safety control methods (200 and 300 in FIGS. 2 and 3) for use in the vehicle safety control apparatus (100 in FIG. 1) using the cameras according to the first embodiment of the present invention, vehicle safety control methods 800 and 900 for use in the vehicle safety control apparatus (700 in FIG. 7) using the cameras according to the third embodiment of the present invention include a photographing step S202, an image processing step S204, a recognition step S206, and storage steps S208 and S308.

Functions and organic connection relations of steps of the vehicle safety control methods 800 and 900 for use in the vehicle safety control apparatus (700 in FIG. 7) using the cameras according to the third embodiment of the present invention are the same as those of the vehicle safety control methods (200 and 300 in FIGS. 2 and 3) for use in the vehicle safety control apparatus (100 in FIG. 1) using the cameras according to the first embodiment of the present invention, and a detailed description thereof will thus be omitted.

Here, the vehicle safety control methods 800 and 900 for use in the vehicle safety control apparatus (700 in FIG. 7) using the cameras according to the third embodiment of the present invention further include second identification steps S812 and S912 to be performed in synchronization with the storage steps S208 and S308.

That is, in the second identification step S812, the second identification unit (716 of FIG. 7) causes a state in which current object images are separately stored to be identified when the first and second current object image data matching the reference object-specific data are separately stored in the storage unit (112 in FIG. 7).

As described above, in the vehicle safety control apparatus 700 using the cameras according to the third embodiment of the present invention including the first camera 102, the second camera 104, the image processing unit 106, the recognition unit 108, the control unit 110, the storage unit 112, and the second identification unit 716, the vehicle safety control methods 800 and 900 including the photographing step S202, the image processing step S204, the recognition step S206, the storage steps S208 and S308, and the second identification steps S812 and S912 are performed.

Accordingly, in the vehicle safety control apparatus 700 and the vehicle safety control methods 800 and 900 using the cameras according to the third embodiment of the present invention, the first camera 102 may photograph a current object at a distance from at least one of a lane, another vehicle, a pedestrian, a signal sign, and a light source at at least one of a narrow angle and a straight angle during running, the second camera 104 may photograph the current object representing at least one light source of a headlight and a taillight of the other vehicle and a signal light at a wide angle, and the storage unit 112 may separately store the current object at the distance from the at least one of the lane, the other vehicle, the pedestrian, the signal sign, and the light source photographed by the first camera 102 at the narrow angle and the current object representing the at least one light source of the headlight and the taillight of the other vehicle and the signal light photographed by the second camera 104 at the wide angle.

According to the vehicle safety control apparatus 700 and the vehicle safety control methods 800 and 900 using the cameras according to the third embodiment of the present invention, it is possible to prevent a traffic accident from occurring in advance while providing convenience of driving for the driver because an image recognition rate may be efficiently increased for a current object during the running.

In addition, in the vehicle safety control apparatus 700 and the vehicle safety control methods 800 and 900 using the cameras according to the third embodiment of the present invention, the second identification unit 716 may cause a state in which current object images are separately stored to be identified.

According to the vehicle safety control apparatus 700 and the vehicle safety control methods 800 and 900 using the cameras according to the third embodiment of the present invention, it is possible to induce a driver to carefully drive during running and further prevent a traffic accident from occurring in advance because the driver may recognize a state in which current object images are separately stored in the storage unit 112.

Figure 10:
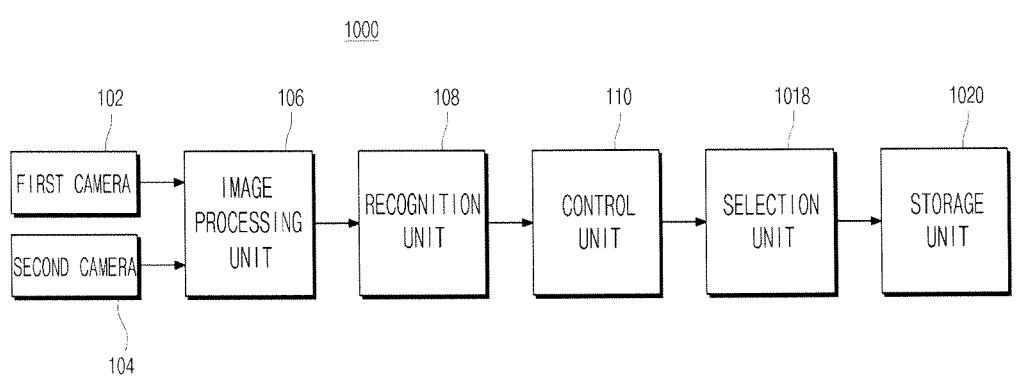
FIG. 10 is a block configuration diagram illustrating a vehicle safety control apparatus using cameras according to a fourth embodiment of the present invention.

FIG. 10 is a block configuration diagram illustrating a vehicle safety control apparatus using cameras according to a fourth embodiment of the present invention.

Referring to FIG. 10, like the vehicle safety control apparatus (100 in FIG. 1) using the cameras according to the first embodiment of the present invention, the vehicle safety control apparatus 1000 using the cameras according to the fourth embodiment of the present invention includes a first camera 102, a second camera 104, an image processing unit 106, a recognition unit 108, and a control unit 110.

Functions and organic connection relations of elements of the vehicle safety control apparatus 1000 using the cameras according to the fourth embodiment of the present invention are the same as those of the vehicle safety control apparatus (100 in FIG. 1) using the cameras according to the first embodiment of the present invention, and a detailed description thereof will thus be omitted.

Here, the vehicle safety control apparatus 1000 using the cameras according to the fourth embodiment of the present invention further includes a selection unit 1018 and a storage unit 1020.

That is, the selection unit 1018 selects a matching mode for causing the first and second current object image data recognized by the recognition unit 108 to match preset reference object-specific data.

Here, although not illustrated, the selection unit 1018 may include a selection button (not illustrated) provided inside the vehicle and configured to select the matching mode for matching the reference object-specific data.

In addition, the storage unit 1020 is provided to separately store the first and second current object image data matching the reference object-specific data in the selection unit 1018.

For example, the storage unit 1020 may store the first current object image data representing a distance from at least one of a lane, another vehicle, a pedestrian, a signal sign, and a light source matching the reference object-specific data and the second current object image data representing at least one light source of a headlight and a taillight of the other vehicle and a signal light matching the reference object-specific data.

In addition, the selection unit 1018 may select a matching mode for causing the first and second current object image data recognized by the recognition unit 108 to match the reference object-specific data set in a geometry model.

Here, the storage unit 1020 may be provided to separately store the second current object image data after estimating a distance of the first current object image data matching the reference object-specific data in the selection unit 1018.

Here, although not illustrated, the storage unit 1020 may include a normal memory (not illustrated). For example, the storage unit 1020 may be a normal SD memory card (not illustrated), and the present invention is not limited thereto. Any storage means for storing image data may be used.

Here, the control unit 110 receives the first and second current object image data recognized by the recognition unit 108 and delivers a selection command in the matching mode for causing the first and second current object image data recognized by the recognition unit 108 to match the reference object-specific data.

A vehicle safety control method for use in the vehicle safety control apparatus 1000 using the cameras according to the fourth embodiment of the present invention will be described with reference to in FIGS. 11 and 12.

Figure 11:
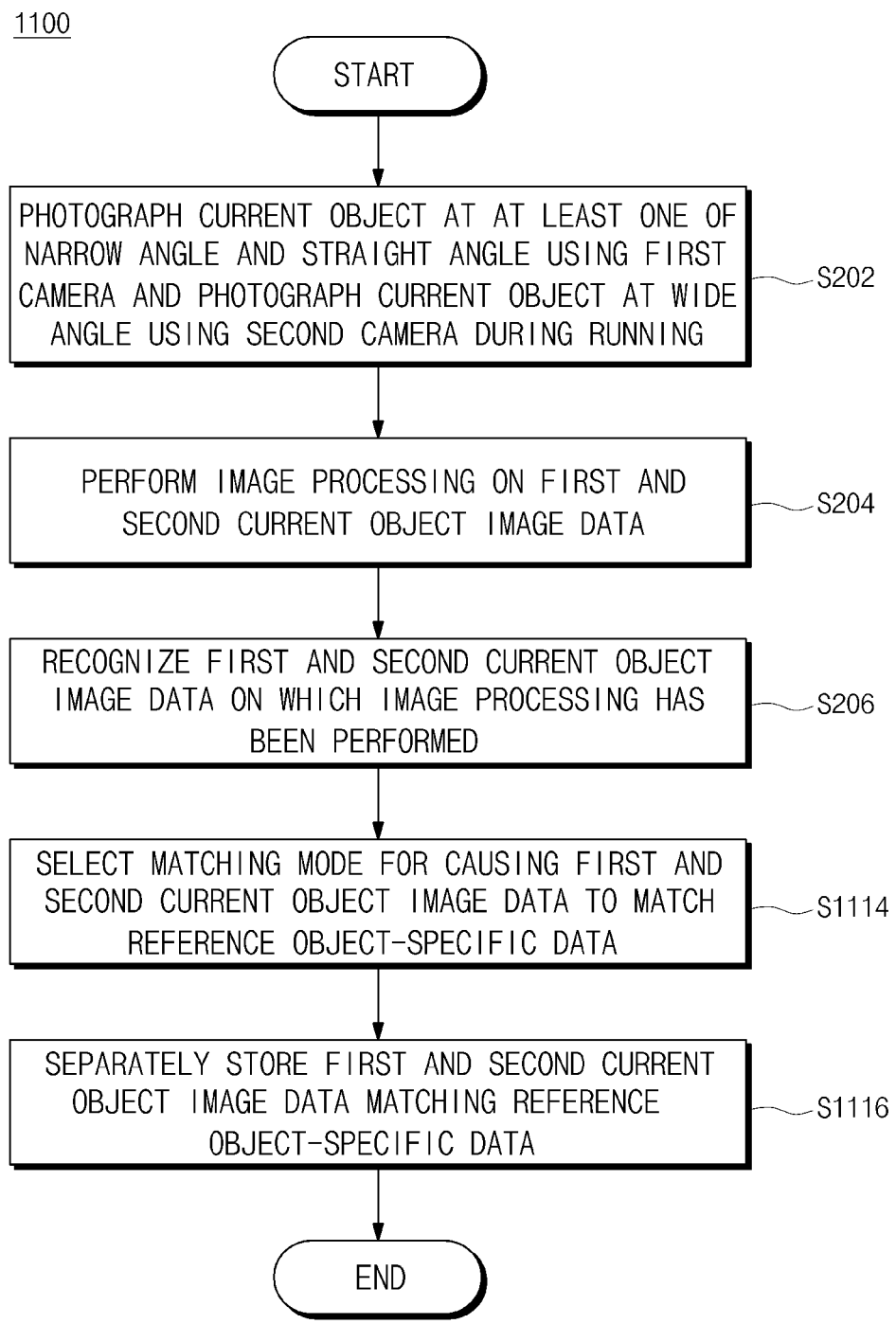
FIG. 11 is a flowchart illustrating a vehicle safety control method for use in the vehicle safety control apparatus using the cameras according to the fourth embodiment of the present invention.
Figure 12:
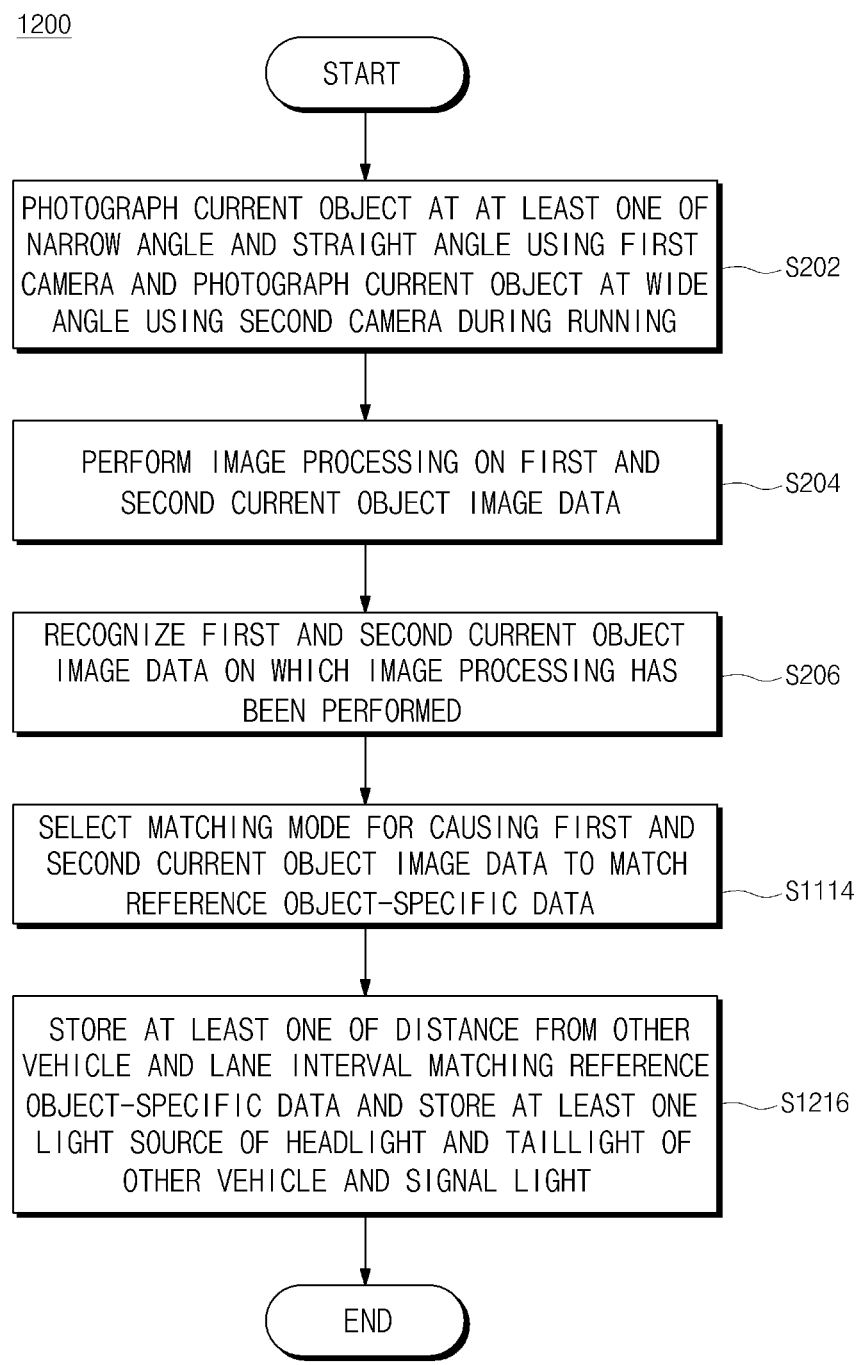
FIG. 12 is a flowchart illustrating an example of the vehicle safety control method for use in the vehicle safety control apparatus using the cameras according to the fourth embodiment of the present invention.

FIG. 11 is a flowchart illustrating the vehicle safety control method for use in the vehicle safety control apparatus using the cameras according to the fourth embodiment of the present invention, and FIG. 12 is a flowchart illustrating an example of the vehicle safety control method for use in the vehicle safety control apparatus using the cameras according to the fourth embodiment of the present invention.

Referring to FIGS. 11 and 12, like the vehicle safety control methods (200 and 300 in FIGS. 2 and 3) for use in the vehicle safety control apparatus (100 in FIG. 1) using the cameras according to the first embodiment of the present invention, vehicle safety control methods 1100 and 1200 for use in the vehicle safety control apparatus (1000 in FIG. 10) using the cameras according to the fourth embodiment of the present invention include a photographing step S202, an image processing step S204, and a recognition step S206.

Functions and organic connection relations of steps of the vehicle safety control methods 1100 and 1200 for use in the vehicle safety control apparatus (1000 in FIG. 10) using the cameras according to the fourth embodiment of the present invention are the same as those of the vehicle safety control methods (200 and 300 in FIGS. 2 and 3) for use in the vehicle safety control apparatus (100 in FIG. 1) using the cameras according to the first embodiment of the present invention, and a detailed description thereof will thus be omitted.

Here, the vehicle safety control methods 1100 and 1200 for use in the vehicle safety control apparatus (1000 in FIG. 10) using the cameras according to the fourth embodiment of the present invention further include a selection step S1114 and storage steps S1116 and S1216 after the recognition step S206.

That is, in the selection step S1114, the selection unit (1018 in FIG. 10) selects a matching mode for causing the first and second current object image data recognized by the recognition unit (108 in FIG. 10) to match preset reference object-specific data.

Thereafter, in the storage step S1116, the storage unit (1020 in FIG. 10) separately stores the first and second current object image data matching the reference object-specific data in the selection unit (1018 in FIG. 10).

For example, as illustrated in FIG. 12, in the storage step S1216, the first current object image data representing a distance from at least one of a lane, another vehicle, a pedestrian, a signal sign, and a light source matching the reference object-specific data may be stored and the second current object image data representing at least one light source of a headlight and a taillight of the other vehicle and a signal light matching the reference object-specific data may be stored.

In addition, although not illustrated, in a selection step (not illustrated), the selection unit (1018 in FIG. 10) may select a matching mode for causing the first and second current object image data recognized by the recognition unit (108 in FIG. 10) to match the reference object-specific data set in a geometry model.

Thereafter, although not illustrated, in a storage step (not illustrated), the storage unit (1020 in FIG. 10) may separately store the second current object image data after estimating a distance of the first current object image data matching the reference object-specific data in the selection unit (1018 in FIG. 10).

As described above, in the vehicle safety control apparatus 1000 using the cameras according to the fourth embodiment of the present invention including the first camera 102, the second camera 104, the image processing unit 106, the recognition unit 108, the control unit 110, the selection unit 1018, and the storage unit 1020, the vehicle safety control methods 1100 and 1200 including the photographing step S202, the image processing step S204, the recognition step S206, the selection step S1114, and the storage steps S1116 and S1216 are performed.

Accordingly, in the vehicle safety control apparatus 1000 and the vehicle safety control methods 1100 and 1200 using the cameras according to the fourth embodiment of the present invention, the first camera 102 may photograph a current object at a distance from at least one of a lane, another vehicle, a pedestrian, a signal sign, and a light source at at least one of a narrow angle and a straight angle during running, the second camera 104 may photograph the current object representing at least one light source of a headlight and a taillight of the other vehicle and a signal light at a wide angle, and the storage unit 1020 may separately store the current object at the distance from the at least one of the lane, the other vehicle, the pedestrian, the signal sign, and the light source photographed by the first camera 102 at the narrow angle and the current object representing the at least one light source of the headlight and the taillight of the other vehicle and the signal light photographed by the second camera 104 at the wide angle according to selection of the selection unit 1018.

According to the vehicle safety control apparatus 1000 and the vehicle safety control methods 1100 and 1200 using the cameras according to the fourth embodiment of the present invention, it is possible to prevent a traffic accident from occurring in advance while providing convenience of driving for a driver because an image recognition rate may be efficiently increased for a current object during running.

Figure 13:
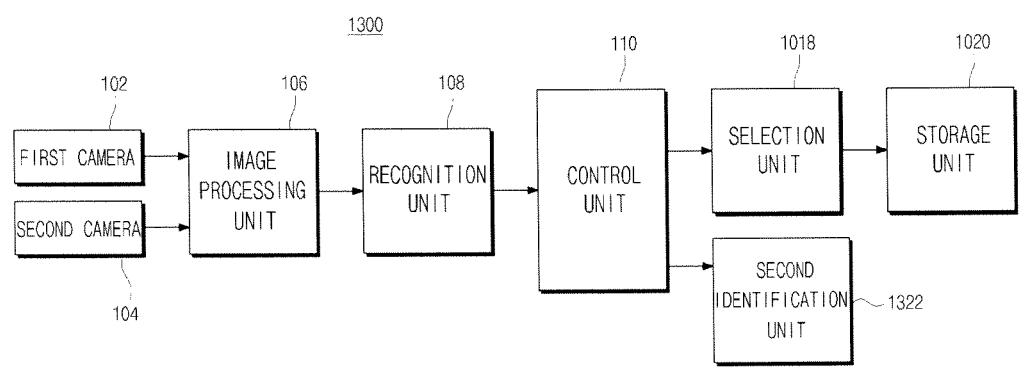
FIG. 13 is a block configuration diagram illustrating a vehicle safety control apparatus using cameras according to a fifth embodiment of the present invention.

FIG. 13 is a block configuration diagram illustrating a vehicle safety control apparatus using cameras according to a fifth embodiment of the present invention.

Referring to FIG. 13, like the vehicle safety control apparatus (1000 in FIG. 10) using the cameras according to the fourth embodiment of the present invention, the vehicle safety control apparatus 1300 using the cameras according to the fifth embodiment of the present invention includes a first camera 102, a second camera 104, an image processing unit 106, a recognition unit 108, a control unit 110, a selection unit 1018, and a storage unit 1020.

Functions and organic connection relations of elements of the vehicle safety control apparatus 1300 using the cameras according to the fifth embodiment of the present invention are the same as those of the vehicle safety control apparatus (1000 in FIG. 10) using the cameras according to the fourth embodiment of the present invention, and a detailed description thereof will thus be omitted.

Here, the vehicle safety control apparatus 1300 using the cameras according to the fifth embodiment of the present invention further includes a second identification unit 1322.

That is, the second identification unit 1322 causes a state in which current object images are separately stored to be identified when the first and second current object image data matching the reference object-specific data are separately stored in the storage unit 1020.

Here, although not illustrated, the second identification unit 1322 may include at least one of an alarm (not illustrated), a speaker (not illustrated), and a light-emitting member (not illustrated) provided to allow a driver to identify information or a state of a vehicle, and at least one of an HMI module (not illustrated) and an HUD module (not illustrated) mounted to form an interface between a user and a machine to allow a driver to recognize information or a state of a vehicle, and, thus cause the state in which the current object images are separately stored to be identified through at least one of an alarm operation of the alarm (not illustrated), a voice operation of the speaker (not illustrated), a light emitting operation of the light emitting member (not illustrated), an HMI message display operation of the HMI module (not illustrated), and an HUD message display operation of the HUD module (not illustrated).

A vehicle safety control method for use in the vehicle safety control apparatus 1300 using the cameras according to the fifth embodiment of the present invention will be described with reference to FIGS. 14 and 15.

Figure 14:
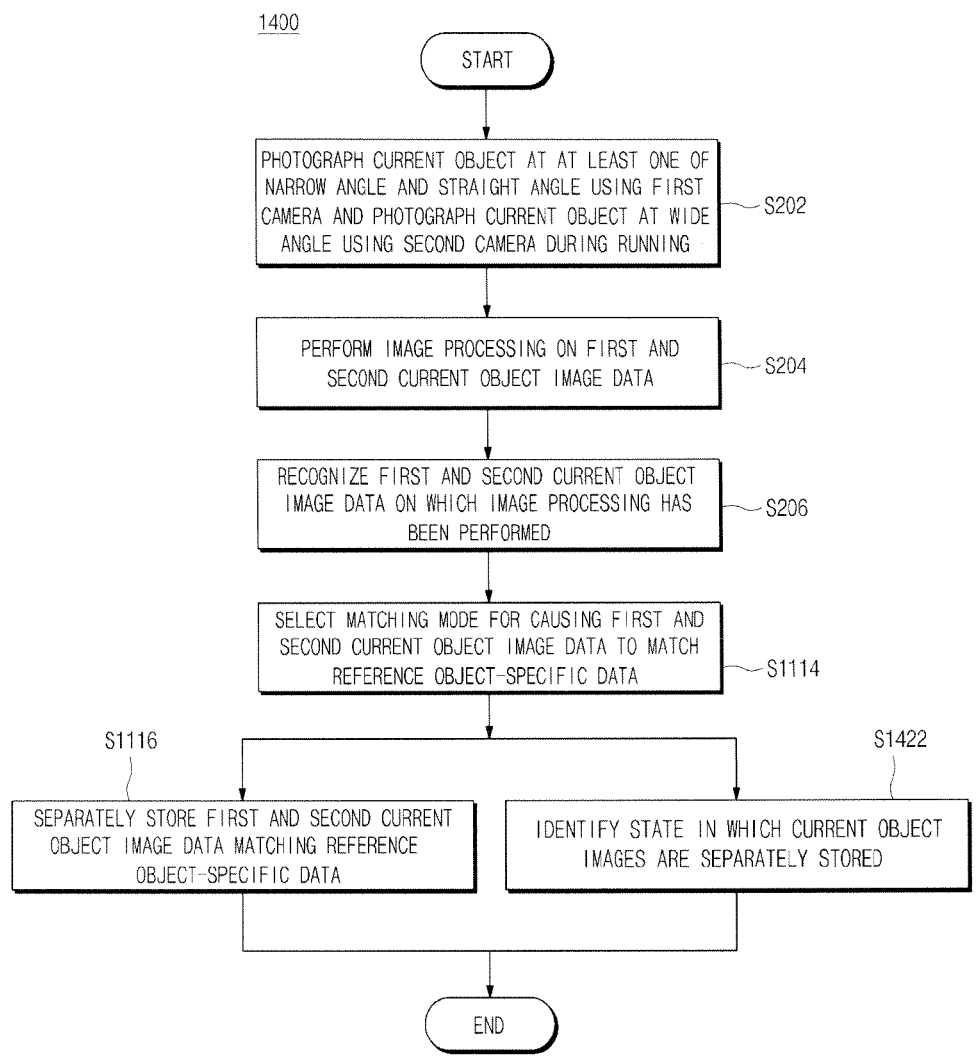
FIG. 14 is a flowchart illustrating a vehicle safety control method for use in the vehicle safety control apparatus using the cameras according to the fifth embodiment of the present invention.
Figure 15:
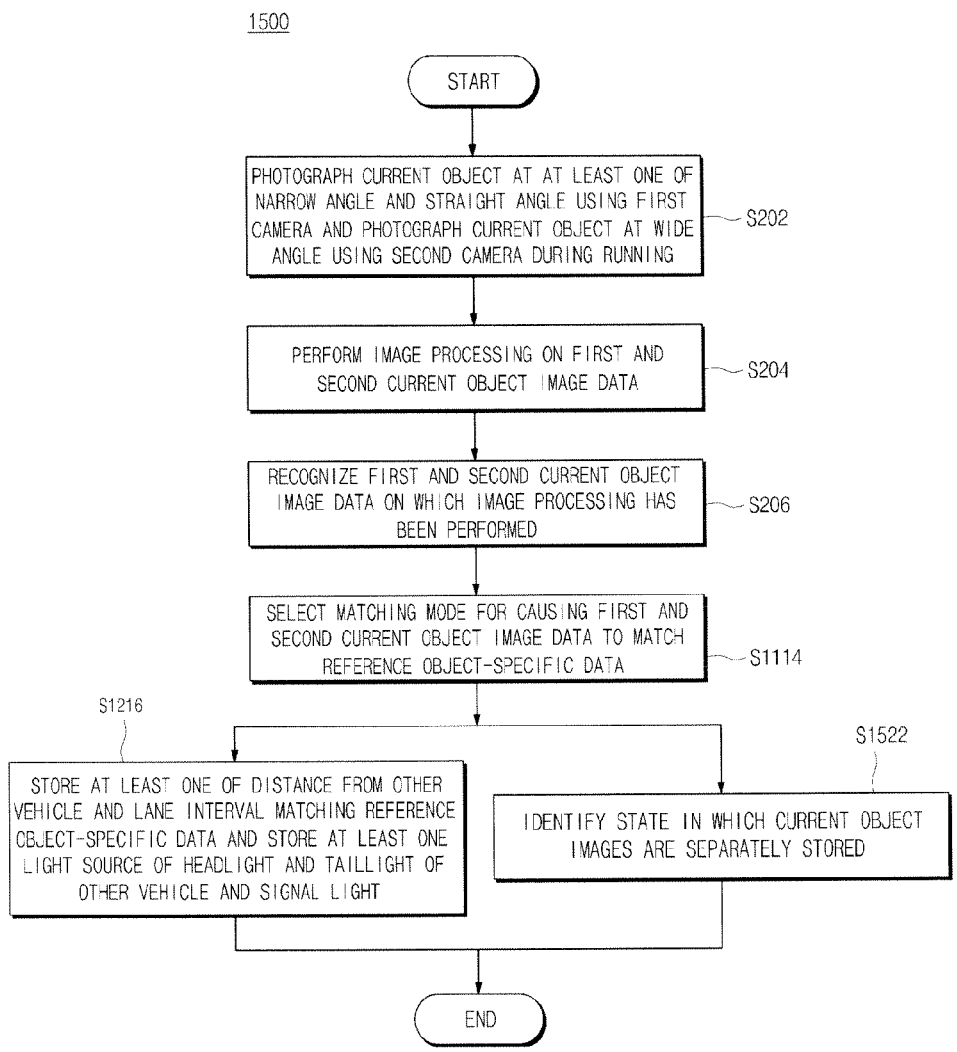
FIG. 15 is a flowchart illustrating an example of the vehicle safety control method for use in the vehicle safety control apparatus using the cameras according to the fifth embodiment of the present invention.

FIG. 14 is a flowchart illustrating the vehicle safety control method for use in the vehicle safety control apparatus using the cameras according to the fifth embodiment of the present invention, and FIG. 15 is a flowchart illustrating an example of the vehicle safety control method for use in the vehicle safety control apparatus using the cameras according to the fifth embodiment of the present invention.

Referring to FIGS. 14 and 15, like the vehicle safety control methods (1100 and 1200 in FIGS. 11 and 12) for use in the vehicle safety control apparatus (1000 in FIG. 10) using the cameras according to the fourth embodiment of the present invention, vehicle safety control methods 1400 and 1500 for use in the vehicle safety control apparatus (1300 in FIG. 13) using the cameras according to the fifth embodiment of the present invention include a photographing step S202, an image processing step S204, a recognition step S206, a selection step S1114, and storage steps S1116 and S1216.

Functions and organic connection relations of steps of the vehicle safety control methods 1400 and 1500 for use in the vehicle safety control apparatus (1300 in FIG. 13) using the cameras according to the fifth embodiment of the present invention are the same as those of the vehicle safety control methods (1100 and 1200 in FIGS. 11 and 12) for use in the vehicle safety control apparatus (1000 in FIG. 10) using the cameras according to the fourth embodiment of the present invention, and a detailed description thereof will thus be omitted.

Here, the vehicle safety control methods 1400 and 1500 for use in the vehicle safety control apparatus (1300 in FIG. 13) using the cameras according to the fifth embodiment of the present invention further include second identification steps S1422 and S1522 to be performed in synchronization with the storage steps S1116 and S1216.

That is, in the second identification step S1422, the second identification unit (1322 of FIG. 13) causes a state in which current object images are separately stored to be identified when the first and second current object image data matching the reference object-specific data are separately stored in the storage unit (1020 in FIG. 13).

As described above, in the vehicle safety control apparatus 1300 using the cameras according to the fifth embodiment of the present invention including the first camera 102, the second camera 104, the image processing unit 106, the recognition unit 108, the control unit 110, the selection unit 1018, the storage unit 1020, and the second identification unit 1322, the vehicle safety control methods 1400 and 1500 including the photographing step S202, the image processing step S204, the recognition step S206, the selection step S1114, the storage steps S1116 and S1216, and the second identification steps S1422 and S1522 are performed.

Accordingly, in the vehicle safety control apparatus 1300 and the vehicle safety control methods 1400 and 1500 using the cameras according to the fifth embodiment of the present invention, the first camera 102 may photograph a current object at a distance from at least one of a lane, another vehicle, a pedestrian, a signal sign, and a light source at at least one of a narrow angle and a straight angle during running, the second camera 104 may photograph the current object representing at least one light source of a headlight and a taillight of the other vehicle and a signal light at a wide angle, and the storage unit 1020 may separately store the current object at the distance from the at least one of the lane, the other vehicle, the pedestrian, the signal sign, and the light source photographed by the first camera 102 at the narrow angle and the current object representing the at least one light source of the headlight and the taillight of the other vehicle and the signal light photographed by the second camera 104 at the wide angle according to selection of the selection unit 1018.

According to the vehicle safety control apparatus 1300 and the vehicle safety control methods 1400 and 1500 using the cameras according to the fifth embodiment of the present invention, it is possible to prevent a traffic accident from occurring in advance while providing convenience of driving for the driver because an image recognition rate may be efficiently increased for a current object during the running.

Further, in the vehicle safety control apparatus 1300 and the vehicle safety control methods 1400 and 1500 using the cameras according to the fifth embodiment of the present invention, the second identification unit 1322 may cause a state in which current object images are separately stored to be identified.

According to the vehicle safety control apparatus 1300 and the vehicle safety control methods 1400 and 1500 using the cameras according to the fifth embodiment of the present invention, it is possible to induce a driver to carefully drive during running and further prevent a traffic accident from occurring in advance because the driver may recognize a state in which current object images are separately stored in the storage unit 1020.

Figure 16:
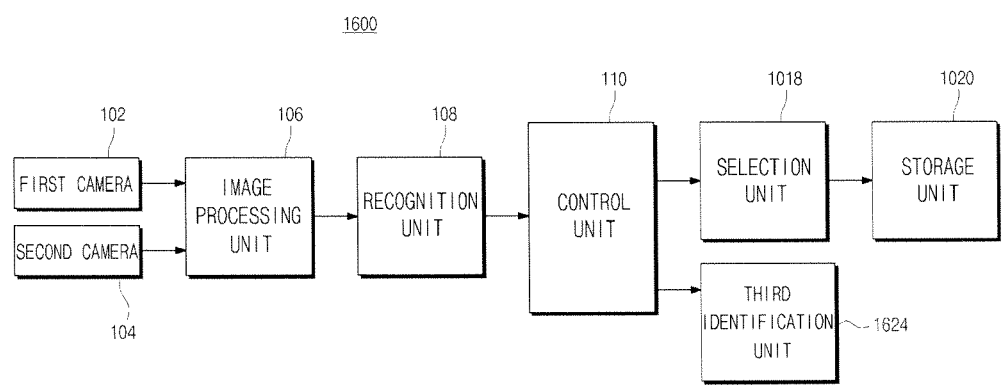
FIG. 16 is a block configuration diagram illustrating a vehicle safety control apparatus using cameras according to a sixth embodiment of the present invention.

FIG. 16 is a block configuration diagram illustrating a vehicle safety control apparatus using cameras according to a sixth embodiment of the present invention.

Referring to FIG. 16, like the vehicle safety control apparatus (1000 in FIG. 10) using the cameras according to the fourth embodiment of the present invention, the vehicle safety control apparatus 1600 using the cameras according to the sixth embodiment of the present invention includes a first camera 102, a second camera 104, an image processing unit 106, a recognition unit 108, a control unit 110, a selection unit 1018, and a storage unit 1020.

Functions and organic connection relations of elements of the vehicle safety control apparatus 1600 using the cameras according to the sixth embodiment of the present invention are the same as those of the vehicle safety control apparatus (1000 in FIG. 10) using the cameras according to the fourth embodiment of the present invention, and a detailed description thereof will thus be omitted.

Here, the vehicle safety control apparatus 1600 using the cameras according to the sixth embodiment of the present invention further includes a third identification unit 1624.

That is, the third identification unit 1624 causes a current matching state for the reference object-specific data to be identified when the first and second current object image data are caused to match the reference object-specific data in the selection unit 1018 according to control of the control unit 110.

Here, although not illustrated, the third identification unit 1624 may include at least one of an alarm (not illustrated), a speaker (not illustrated), and a light-emitting member (not illustrated) provided to allow a driver to identify information or a state of a vehicle, and at least one of an HMI module (not illustrated) and an HUD module (not illustrated) mounted to form an interface between a user and a machine to allow a driver to recognize information or a state of a vehicle, and, thus cause the current matching state for the reference object-specific data to be identified through at least one of an alarm operation of the alarm (not illustrated), a voice operation of the speaker (not illustrated), a light emitting operation of the light emitting member (not illustrated), an HMI message display operation of the HMI module (not illustrated), and an HUD message display operation of the HUD module (not illustrated).

A vehicle safety control method for use in the vehicle safety control apparatus 1600 using the cameras according to the sixth embodiment of the present invention will be described with reference to FIGS. 17 and 18.

Figure 17:
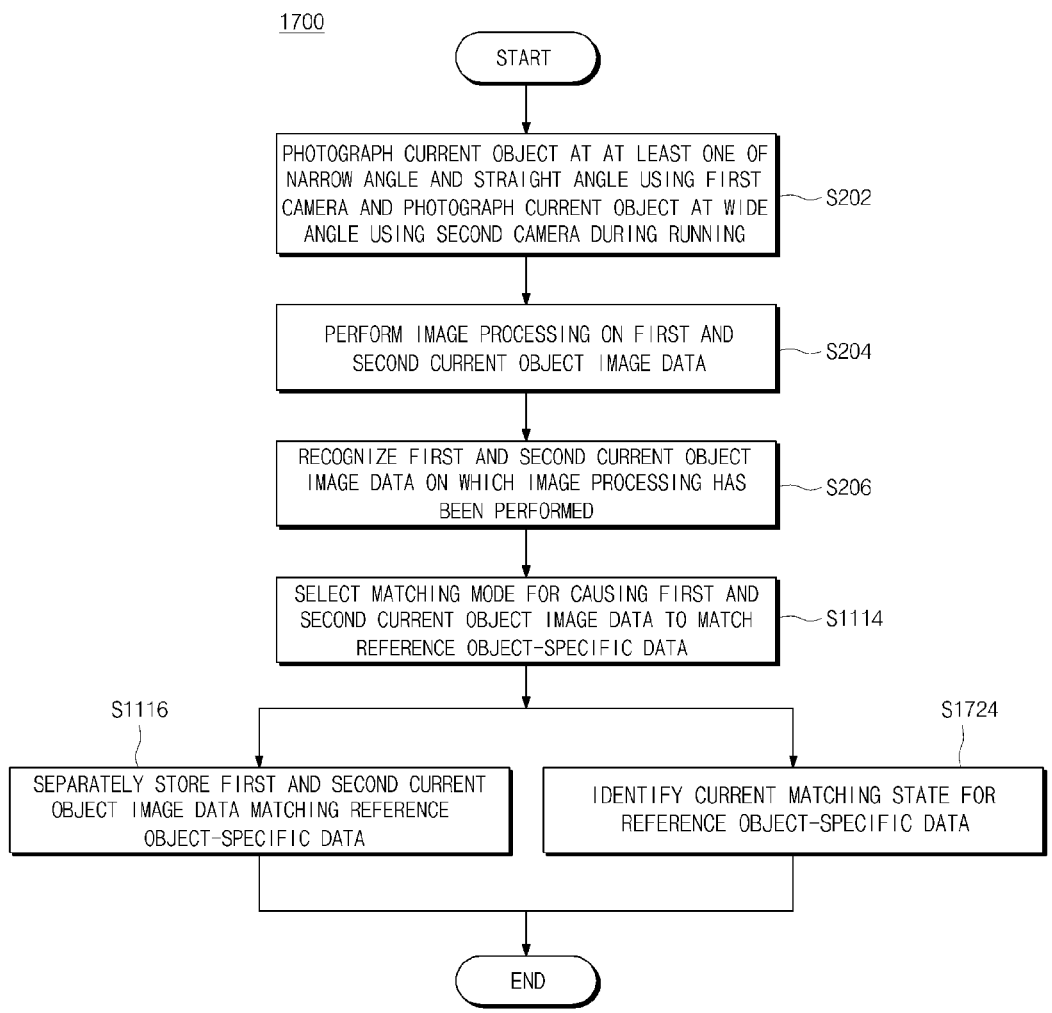
FIG. 17 is a flowchart illustrating a vehicle safety control method for use in the vehicle safety control apparatus using the cameras according to the sixth embodiment of the present invention.
Figure 18:
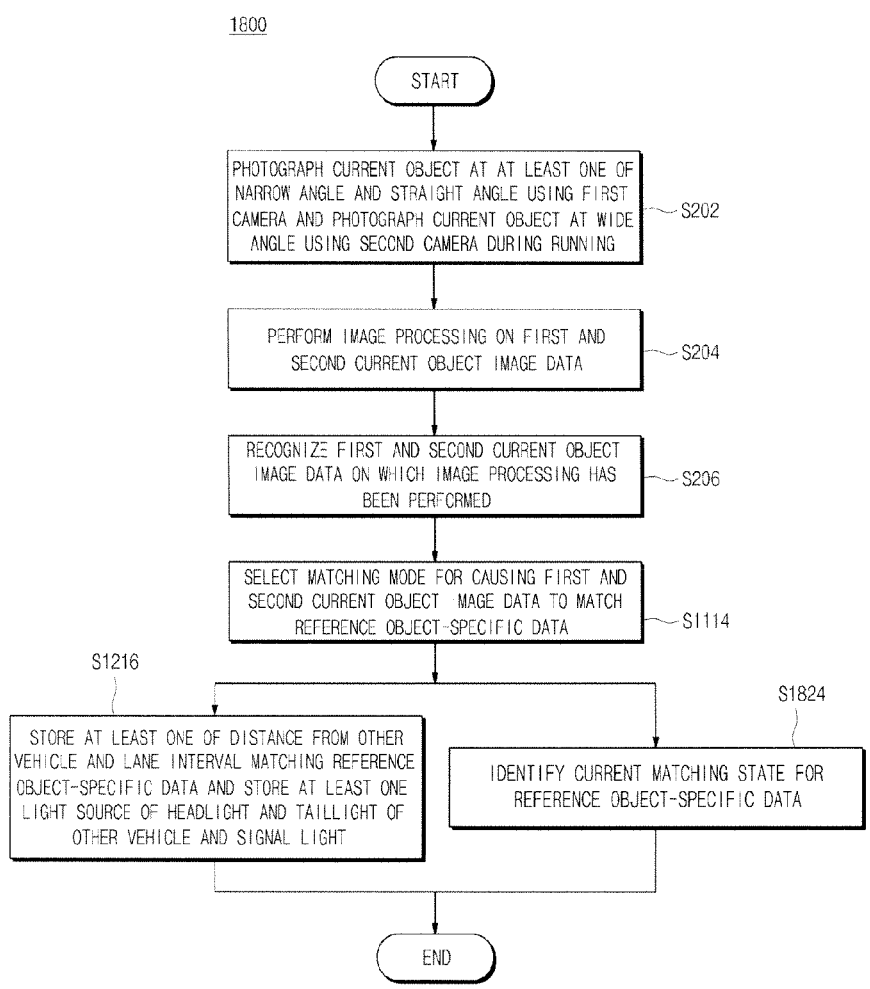
FIG. 18 is a flowchart illustrating an example of the vehicle safety control method for use in the vehicle safety control apparatus using the cameras according to the sixth embodiment of the present invention.

FIG. 17 is a flowchart illustrating the vehicle safety control method for use in the vehicle safety control apparatus using the cameras according to the sixth embodiment of the present invention, and FIG. 18 is a flowchart illustrating an example of the vehicle safety control method for use in the vehicle safety control apparatus using the cameras according to the sixth embodiment of the present invention.

Referring to FIGS. 17 and 18, like the vehicle safety control methods (1100 and 1200 in FIGS. 11 and 12) for use in the vehicle safety control apparatus (1000 in FIG. 10) using the cameras according to the fourth embodiment of the present invention, vehicle safety control methods 1700 and 1800 for use in the vehicle safety control apparatus (1600 in FIG. 16) using the cameras according to the sixth embodiment of the present invention include a photographing step S202, an image processing step S204, a recognition step S206, a selection step S1114, and storage steps S1116 and S1216.

Functions and organic connection relations of steps of the vehicle safety control methods 1700 and 1800 for use in the vehicle safety control apparatus (1600 in FIG. 16) using the cameras according to the sixth embodiment of the present invention are the same as those of the vehicle safety control methods (1100 and 1200 in FIGS. 11 and 12) for use in the vehicle safety control apparatus (1000 in FIG. 10) using the cameras according to the fourth embodiment of the present invention, and a detailed description thereof will thus be omitted.

Here, the vehicle safety control methods 1700 and 1800 for use in the vehicle safety control apparatus (1600 in FIG. 16) using the cameras according to the sixth embodiment of the present invention further include third identification steps S1724 and S1824 to be performed in synchronization with the storage steps S1116 and S1216.

That is, in the third identification step S1724, the third identification unit (1624 of FIG. 16) causes the current matching state for the reference object-specific data to be identified when the first and second current object image data are caused to match the reference object-specific data according to control of the control unit (110 of FIG. 16) in the selection unit (1018 in FIG. 16).

As described above, in the vehicle safety control apparatus 1600 using the cameras according to the sixth embodiment of the present invention including the first camera 102, the second camera 104, the image processing unit 106, the recognition unit 108, the control unit 110, the selection unit 1018, the storage unit 1020, and the third identification unit 1624, the vehicle safety control methods 1700 and 1800 including the photographing step S202, the image processing step S204, the recognition step S206, the selection step S1114, the storage steps S1116 and S1216, and the third identification steps S1724 and S1824 are performed.

Accordingly, in the vehicle safety control apparatus 1600 and the vehicle safety control methods 1700 and 1800 using the cameras according to the sixth embodiment of the present invention, the first camera 102 may photograph a current object at a distance from at least one of a lane, another vehicle, a pedestrian, a signal sign, and a light source at at least one of a narrow angle and a straight angle during running, the second camera 104 may photograph the current object representing at least one light source of a headlight and a taillight of the other vehicle and a signal light at a wide angle, and the storage unit 1020 may separately store the current object at the distance from the at least one of the lane, the other vehicle, the pedestrian, the signal sign, and the light source photographed by the first camera 102 at the narrow angle and the current object representing the at least one light source of the headlight and the taillight of the other vehicle and the signal light photographed by the second camera 104 at the wide angle according to selection of the selection unit 1018.

According to the vehicle safety control apparatus 1600 and the vehicle safety control methods 1700 and 1800 using the cameras according to the sixth embodiment of the present invention, it is possible to prevent a traffic accident from occurring in advance while providing convenience of driving for a driver because an image recognition rate may be efficiently increased for a current object during running.

In addition, in the vehicle safety control apparatus 1600 and the vehicle safety control methods 1700 and 1800 using the cameras according to the sixth embodiment of the present invention, the third identification unit 1624 may cause a current matching state for the reference object-specific data to be identified.

According to the vehicle safety control apparatus 1600 and the vehicle safety control methods 1700 and 1800 using the cameras according to the sixth embodiment of the present invention, it is possible to induce a driver to carefully drive during running and prevent a traffic accident from occurring in advance because the driver may recognize a state in which the current object currently matches the reference object-specific data in the storage unit 1020.

As is apparent from the above description, an vehicle safety control apparatus and method using cameras according to the embodiment of the present invention have the following effects.

First, there is an advantage in that it is possible to prevent a traffic accident from occurring in advance while providing convenience of driving for a driver because an image recognition rate may be efficiently increased for a current object during running.

Second, there is an advantage in that it is possible to further prevent a traffic accident from occurring in advance because it is possible to induce the driver to carefully drive during running.

Although exemplary embodiments of the present invention have been described for illustrative purposes, those skilled in the art will appreciate that various modifications, additions, and substitutions are possible, without departing from the scope and spirit of the invention as disclosed in the accompanying claims. Therefore, the exemplary embodiments described above should be understood as illustrative not restrictive in all aspects. The present invention is defined only by the scope of the appended claims and must be construed as including the meaning and scope of the claims, and all changes and modifications derived from equivalent concepts of the claims.

What is claimed is:

1. A vehicle safety control apparatus using cameras, comprising:
   a first camera for photographing a current object at least one of a narrow angle and a straight angle during running;
   a second camera for photographing the current object at a wide angle during the running;
   an image processor for performing image processing on first current object image data captured by the first camera and second current object image data captured by the second camera;
   a recognition sensor for recognizing the first and second current object image data on which the image processor has performed the image processing;
   a storage for causing the first and second current object image data recognized by the recognition sensor to match preset reference object-specific data and separately store the first and second current object image data matching the reference object-specific data; and
   a controller for receiving the first and second current object image data recognized by the recognition sensor and for delivering a storage command to the storage so that the first and second current object image data matching the reference object-specific data are separately stored.

2. A vehicle safety control apparatus using cameras, comprising:
   a first camera for photographing a current object at least one of a narrow angle and a straight angle during running;
   a second camera for photographing the current object at a wide angle during the running;
   an image processor for performing image processing on first current object image data captured by the first camera and second current object image data captured by the second camera;
   a recognition sensor for recognizing the first and second current object image data on which the image processor has performed the image processing;
   a selection button for selecting a matching mode for causing the first and second current object image data recognized by the recognition sensor to match preset reference object-specific data;
   a storage for separately storing the first and second current object image data matching the preset reference object-specific data in the selection button; and
   a controller for receiving the first and second current object image data recognized by the recognition sensor and for delivering a selection command in the matching mode for causing the first and second current object image data recognized by the recognition sensor to match the reference object-specific data.

3. The vehicle safety control apparatus using the cameras according to claim 1, wherein the first camera includes a narrow angle lens.

4. The vehicle safety control apparatus using the cameras according to claim 2, wherein the first camera includes a narrow angle lens.

5. The vehicle safety control apparatus using the cameras according to claim 1, wherein the second camera includes a wide angle lens.

6. The vehicle safety control apparatus using the cameras according to claim 2, wherein the second camera includes a wide angle lens.

7. The vehicle safety control apparatus using the cameras according to claim 1, wherein the first current object image data represents a distance from at least one of a lane, another vehicle, a pedestrian, a signal sign, and a light source.

8. The vehicle safety control apparatus using the cameras according to claim 2, wherein the first current object image data represents a distance from at least one of a lane, another vehicle, a pedestrian, a signal sign, and a light source.

9. The vehicle safety control apparatus using the cameras according to claim 1, wherein the second current object image data represents at least one of a lane, another vehicle, a pedestrian, a signal sign, and a light source.

10. The vehicle safety control apparatus using the cameras according to claim 2, wherein the second current object image data represents at least one of a lane, another vehicle, a pedestrian, a signal sign, and a light source.

11. The vehicle safety control apparatus using the cameras according to claim 7, wherein the light source is at least one of a headlight and a taillight of the other vehicle and a signal light.

12. The vehicle safety control apparatus using the cameras according to claim 8, wherein the light source is at least one of a headlight and a taillight of the other vehicle and a signal light.

13. The vehicle safety control apparatus using the cameras according to claim 9, wherein the light source is at least one of a headlight and a taillight of the other vehicle and a signal light.

14. The vehicle safety control apparatus using the cameras according to claim 10, wherein the light source is at least one of a headlight and a taillight of the other vehicle and a signal light.

15. The vehicle safety control apparatus using the cameras according to claim 1,
wherein the controller causes a current matching state for the reference object-specific data to be identified when the first and second current object image data are caused to match the reference object-specific data in the storage according to control of the controller.

16. The vehicle safety control apparatus using the cameras according to claim 1,
wherein the controller causes a state in which current object images are separately stored to be identified when the first and second current object image data matching the reference object-specific data are separately stored in the storage.

17. The vehicle safety control apparatus using the cameras according to claim 2,
wherein the controller causes a state in which current object images are separately stored to be identified when the first and second current object image data matching the reference object-specific data are separately stored in the storage.

18. The vehicle safety control apparatus using the cameras according to claim 2,
wherein the controller a current matching state for the reference object-specific data to be identified when the first and second current object image data are caused to match the reference object-specific data in the selection button according to control of the controller.

19. A vehicle safety control method using cameras, comprising:
photographing, by a first camera, a current object at least one of a narrow angle and a straight angle and photographing, by a second camera, the current object at a wide angle during running;
performing, by an image processor, image processing on first current object image data captured by the first camera and second current object image data captured by the second camera;
recognizing, by a recognition sensor, the first and second current object image data on which the image processor has performed the image processing; and
causing, by a storage, the first and second current object image data recognized by the recognition sensor to match preset reference object-specific data and separately storing, by the storage, the first and second current object image data matching the reference object-specific data.

20. A vehicle safety control method using cameras, comprising:
photographing, by a first camera, a current object at at least one of a narrow angle and a straight angle and photographing, by a second camera, the current object at a wide angle during running;
performing, by an image processor, image processing on first current object image data captured by the first camera and second current object image data captured by the second camera;
recognizing, by a recognition sensor, the first and second current object image data on which the image processor has performed the image processing;
selecting, by a selection button, a matching mode for causing the first and second current object image data recognized by the recognition sensor to match preset reference object-specific data; and
separately storing, by a storage, the first and second current object image data matching the preset reference object-specific data in the selection button.

21. The vehicle safety control method using the cameras according to claim 19, further comprising:
causing a current matching state for the reference object-specific data to be identified when the first and second current object image data are caused to match the reference object-specific data in the storage according to control of a controller.

22. The vehicle safety control method using the cameras according to claim 19, further comprising:
causing a state in which current object images are separately stored to be identified when the first and second current object image data matching the reference object-specific data are separately stored in the storage according to control of a controller.

23. The vehicle safety control method using the cameras according to claim 20, further comprising:
causing a state in which current object images are separately stored to be identified when the first and second current object image data matching the reference object-specific data are separately stored in the storage according to control of a controller.

24. The vehicle safety control method using the cameras according to claim 20, further comprising:
causing a current matching state for the reference object-specific data to be identified when the first and second current object image data are caused to match the reference object-specific data in the selection button according to control of the controller.

* * * * *